3,153,034
BASIC AZO-DYESTUFFS
Hans Wilhelm Liechti, Oberwil, Basel-Land, Switzerland, assignor to Ciba Limited, Basel, Switzerland, a company of Switzerland
No Drawing. Filed May 21, 1962, Ser. No. 196,454
Claims priority, application Switzerland, May 26, 1961, 6,145/61
6 Claims. (Cl. 260—205)

This invention provides basic azo-dyestuffs of the general formula (1) 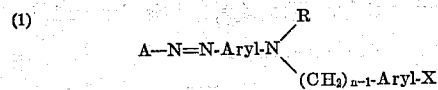

in which A represents a benzene radical, each "Aryl" advantageously represents a benzene radical, R represents a hydrogen atom or a substituent that does not inhibit the capacity of the aryl radical for coupling, X represents a quaternary amino group, and $n$ is a positive whole number.

The invention also provides a process for the manufacture of the aforesaid azo-dyestuffs, wherein a diazotized aminobenzene is coupled with an amine of the formula (2) 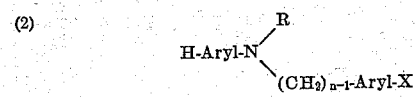

in which the aryl radicals are advantageously phenyl radicals, the hydrogen atom at the left in the formula occupies the coupling position, $n$ is a whole positive number, R represents hydrogen or a substituent that does not inhibit the capacity of the aryl radical for coupling and X represents a quaternary amino or ammonium group.

The coupling components used in the process of the invention may be derived, for example, from an aminodiphenylamine, for example, 4-amino-diphenylamine, which may, for example, be converted into a coupling component of the formula (3) 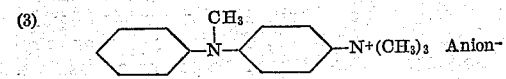

by exhaustive methylation.

In Berichte, 85, pages 1056 to 1060 (1952), S. Huenig describes a method by which it is also possible to prepare coupling components of the formula (4) 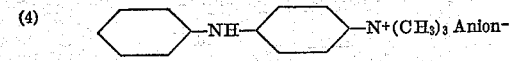

Coupling components of the Formula 2, in which $n$ is 2, may be derived from amino-substituted benzyl-aminobenzenes, for example, 4-aminobenzyl-aniline or 4-aminobenzyldiphenylamine.

In the Formula 2 R may represent, for example, an alkyl radical, especially one not containing very many carbon atoms, for example, not more than 12. Also especially suitable as alkyl radicals are substituted alkyl radicals, such as hydrooxyalkyl, alkoxy-alkyl and cyano-alkyl radicals, such radicals advantageously containing the substituent in the β-position of the alkyl radical. The radical R may also represent an aralkyl radical, such as a benzyl radical or a benzene radical, or a heterocyclic radical, and if such radical contains substituents, that are not in positions vicinal to the nitrogen atom, in most cases such substituents do not appreciably impair the coupling capacity of the coupling component.

Substituents for forming the quaternary amino group are advantageously identical or different alkyl radicals of low molecular weight.

Especially valuable dyestuffs are obtained with amino-benzenes as diazo-components which contain substituents which have a powerful electron-absorbing action, such as nitro or alkyl-sulfone groups; such substituents may with advantage occupy a position which is not vicinal to the diazo group, for example, the para-position, and especially amines of the formula

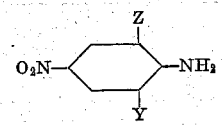

in which Y and Z each represent a hydrogen or halogen atom or an alkyl or alkylsulfonyl group. As examples there may be mentioned: diazotized 1-amino-4-nitrobenzene, 1-amino-2-chloro- or -2-methyl- or -2-methoxy-4-nitrobenzene, 1-amino-2-methyluslfonyl-4-nitrobenzene, 1-amino-2-carbethoxy-4-nitrobenzene, 1-amino-2:6-dichloro-4-nitrobenzene and 1-amino-2-chlorobenzene-4-methylsulfone.

The coupling reaction may be carried out in the usual manner in aqueous medium, and depending on the nature of reactants used, reaction is carried out in a medium rendered acid with a mineral acid, for example, hydrochloric acid, or in a medium that can be rendered less acid, for example, by the addition of sodium acetate or other buffer substance. In some cases, it may be of advantage to add an agent which assists coupling, for example, dimethyl-formamide.

The new dyestuffs can also be obtained by a modification of the above process, wherein an azo-dyestuff of the formula

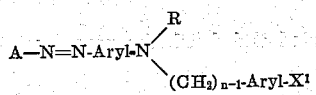

in which $X^1$ represents a primary, secondary or tertiary amino group, is treated with an alkylating agent. As examples of alkylating agents there may be mentioned: methyl chloride, methyl bromide or methyl iodide, tri-methyloxonium borofluoride, dimethyl sulfate, diethyl sulfate, benzene sulfonic acid methyl ester, para-toluene sulfonic acid ethyl or butyl ester. The alkylation is advantageously carried out with the aid of heat in an inert organic solvent, for example, in a hydrocarbon, such as benzene, toluene or xylene, or a halogen-hydrocarbon, such as carbon tetrachloride, tetrachlorethane, chlorobenzene or ortho-dichlorobenzene, or a nitro-hydrocarbon, such as nitromethane, nitrobenzene or nitro-naphthalene. Also suitable are acid anhydrides, acid amides or nitriles, such as acetic acid anhydride, dimethylformamide or acetonitrile, and also dimethyl sulfoxide. A large excess of the alkylating agent may be used instead of an inert solvent. In this case, care should be taken to ensure that the mixture is not excessively heated, since the reaction is highly exothermic. In most cases, however, it is necessary to apply heat to the reaction mixture in order to start the reaction, especially when an organic solvent is present. In some cases, the alkylation can be carried out in an aqueous medium or in the presence of an alcohol, and, if desired, in the presence of a small quantity of potassium iodide.

In the case of azo-dyestuffs that contain only tertiary amino groups, the alkylating agent merely quaternates the nitrogen atom, i.e. brings about the formation of a quaternary ammonium group. When the azo-dyestuff contains primary amino groups or secondary amino groups, alkylation to the tertiary amine takes place first and then the formation of the quaternary ammonium group. In order to obtain a good yield it is of advantage in all cases to use an excess of alkylating agent. If desired, the acids formed during the alkylation of the primary or secondary amino groups may be caused to form salts with added strong tertiary bases, such as ethyl-di-isopropylamine, which for steric reasons are incapable of being alkylated.

The dyestuff salts are advantageously purified by dissolving them in water, and filtering off any unreacted starting dyestuff in the form of insoluble radical. The dyestuff can be isolated from the aqueous solution by the addition of a water-soluble salt, for example, sodium chloride.

The dyestuffs so obtained are new, and can be used as basic azo-dyestuffs for dyeing or printing materials that are dyed or printed with this class of dyestuffs, for example, cotton mordanted with tannic acid, silk, wool and similar animal fibers. They are also especially suitable for dyeing or printing fibers based on polyacrylonitrile, for example, fibers having a polyacrylonitrile content of at least 80%, the dyeing capacity of such fibers being, if desired, enhanced in known manner by having additives polymerized therein. There are obtained, especially on polyacrylonitrile fibers, strong tints that are fast to light and of good fastness to washing and sublimation. They yield practically solid dyeings on mixtures of wool and polyacrylonitrile fibers.

The following examples illustrate the invention, the parts and percentages being by weight.

*Example 1*

17.25 parts of 1-amino-2-chloro-4-nitrobenzene are diazotized in the usual manner, and then coupled with a hydrochloric acid solution of 26.25 parts of trimethyl-(4-anilino-phenyl)-ammonium chloride. Coupling starts immediately, and is completed by the addition of sodium acetate until the mixture has an acetic acid reaction. The dyestuff, which partially precipitates, is completely precipitated by the addition of 15 parts of sodium chloride.

When isolated and dried, the new dyestuff of the formula

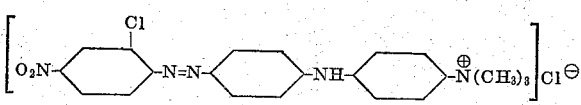

is a brown powder which gives a red solution when dissolved in water. It dyes fibers and fabrics made of polyacrylonitrile, such as Orlon 42, Dralon or Acrilan, scarlet red tints possessing excellent properties of fastness.

By using as the diazo-component 1-amino-2:6-dichloro-4-nitrobenzene or 1-amino-2-methoxy-4-nitrobenzene or 4-amino-3-chlorophenyl-1-methyl-sulfone, instead of 1-amino-2-chloro-4-nitrobenzene, there are obtained dyestuffs which dye the aforesaid fibers reddish orange tints possessing the same good properties of fastness.

The coupling component was prepared by the quaternation of 4-aminodiphenylamine by the method described by S. Huenig in Berichte 85, pages 1056 to 1060 (1952).

*Example 2*

17.25 parts of 1-amino-2-chloro-4-nitrobenzene are diazotized in the usual manner, and then coupled with a hydrochloric acid solution of 27.75 parts of trimethyl-(4-N-methyl-anilino-phenyl)-ammonium chloride. Coupling starts immediately and, at 20° C., is complete in one hour. The dyestuff, which precipitates completely, is isolated and dried.

This new dyestuff of the formula

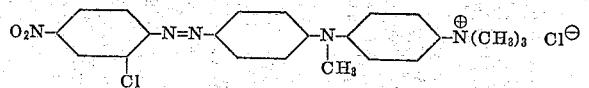

is a reddish brown powder which gives a red solution when dissolved in water. It dyes fibers and fabrics made of polyacrylonitrile, such as Orlon 42, Dralon or Acrilan, strong red tints possessing excellent properties of fastness.

By using 1-amino-2:4-dinitrobenzene or 1-amino-2-methoxy-4-nitrobenzene as diazo component, instead of 1-amino-2-chloro-4-nitrobenzene, there are obtained dyestuffs which dye the aforesaid fibers red tints possessing the same good properties of fastness.

The coupling component was prepared by the quaternation of N'-methyl-N'-phenyl-para-phenylene diamine by the method described by S. Huenig in Berichte 85, pages 1056 to 1060 (1952).

*Example 3*

13.8 parts of 1-amino-4-nitrobenzene are diazotized, and then coupled with a hydrochloric acid solution of 35.25 parts of trimethylbenzyl - (diphenylamine)-ammonium chloride. Coupling takes place rapidly, and the dye-stuff precipitates completely. The dyestuff is isolated and dried.

This new dyestuff of the formula

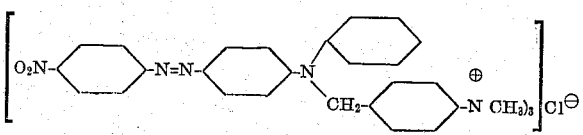

is a brown powder, which gives a red solution when dissolved in water. It dyes fibers and fabrics made of polyacrylonitrile, such as Orlon 42, Dralon or Acrilan, reddish orange tints possessing very good properties of fastness.

The coupling component used was prepared by the quaternation of 4-aminobenzyl-diphenylamine as described by S. Huenig.

*Example 4*

15.2 parts of 2-amino-nitrotoluene are diazotized, and then coupled with a hydrochloric acid solution of 35.25 parts of trimethylphenyl-(phenylbenzylamine)-ammonium chloride. Coupling takes place rapidly, and the dyestuff precipitates out. The dyestuff is isolated and dried.

This new dyestuff of the formula

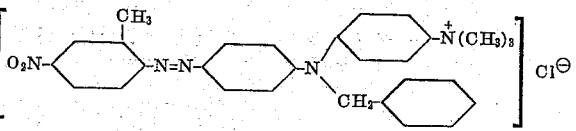

is a brown powder, which gives a red solution when dissolved in water. It dyes fibers and fabrics made of polyacrylonitrile, such as Orlon 42, Dralon or Acrilan, red-orange tints possessing very good properties of fastness.

The coupling component used was prepared by the quaternation of 4-aminodiphenyl-benzylamine as described by S. Huenig.

*Example 5*

50.6 parts of the dystuff of the formula

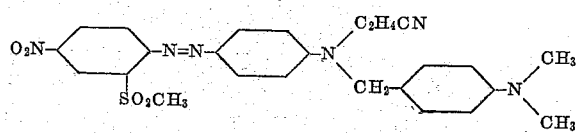

are stirred into 600 parts of chlorobenzene. A mixture of 14 parts of dimethyl sulfate and 25 parts of chlorobenzene are then added dropwise over a period of 30 minutes at 110 to 115° C. The whole is then stirred for a further 2 hours at 110 to 115° C.

When the reaction mixture is cool, the precipitated dyestuff is isolated by suction filtration and then dissolved in boiling water. The dyestuff solution is purified by filtration with active carbon, and the dyestuff is then salted out of the filtrate.

The new dyestuff so obtained is a brown powder which gives a red solution when dissolved in water, and dyes fibers and fabrics made of polyacrylonitrile red-orange tints possessing very good properties of fastness.

Example 6

44.4 parts of the dyestuff of the formula

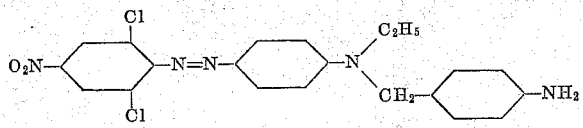

are stirred into 400 parts of dimethylformamide at 100° C. 50 parts of dimethyl sulfate are then added dropwise over a period of 30 minutes at 110 to 115° C., and the whole is then stirred for 2 hours at 110 to 115° C. The dyestuff is purified by dissolving it in boiling water, filtration with active carbon and salting out.

The new dyestuff so obtained is a brown powder which gives a red solution when dissolved in water, and dyes fibers and fabrics made of polyacrylonitrile orange tints possessing very good properties of fastness.

Example 7

1 part of the dyestuff obtained as described in Example 2 is dissolved in 5000 parts of water containing 2 parts of acetic acid of 40% strength. Into this dyebath are entered, at 60° C., 100 parts of a boiled yarn made of polyacrylonitrile staple fibers. The temperature of the dyebath is raised to 100° C. in the course of half an hour, and dyeing is carried out for one hour at the boil. The dyed material is then well rinsed and dried. There is obtained a red dyeing which possesses a very good fastness to light, sublimation and washing.

What is claimed is:

1. Basic azo-dyestuffs of the formula

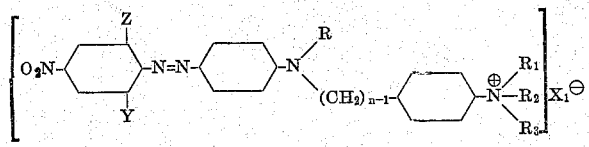

in which Y and Z each represent a member selected from the group consisting of hydrogen and chlorine atoms, lower alkyl and lower alkyl-sulfonyl groups, R represents a member selected from the group consisting of hydrogen atoms, lower alkyl, cyano-ethyl-benzyl and phenyl groups, $R_1$, $R_2$ and $R_3$ each represents a lower alkyl group, $X_1$ represents an anion, and $n$ is a whole number from 1 to 2.

2. The dyestuff of the formula

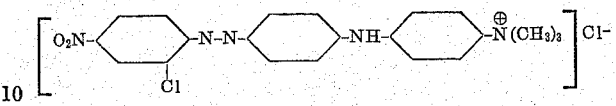

3. The dyestuff of the formula

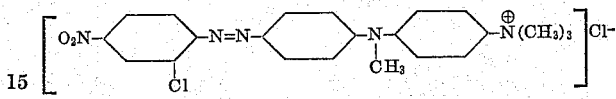

4. The dyestuff of the formula

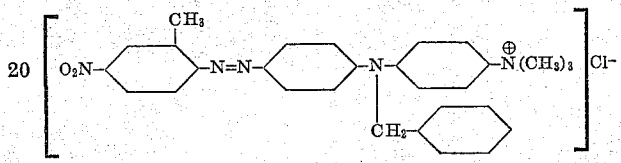

5. The dyestuff of the formula

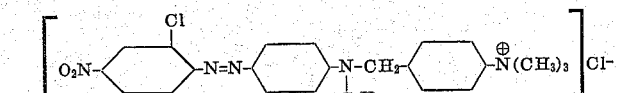

6. The dyestuff of the formula

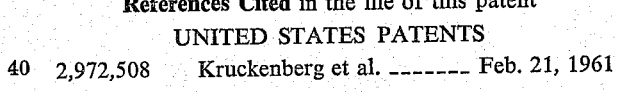

References Cited in the file of this patent

UNITED STATES PATENTS 2,972,508    Kruckenberg et al. _____ Feb. 21, 1961